US009277284B2

(12) United States Patent
Haeuser et al.

(10) Patent No.: US 9,277,284 B2
(45) Date of Patent: *Mar. 1, 2016

(54) SYSTEM AND METHOD FOR A HOUSEHOLD MOSAIC VIEWER

(71) Applicant: AT&T Intellectual Property I, LP, Atlanta, GA (US)

(72) Inventors: Anthony A Haeuser, Aurora, IL (US); George W Shaw, IV, Frisco, TX (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/294,795

(22) Filed: Jun. 3, 2014

(65) Prior Publication Data

US 2014/0289757 A1 Sep. 25, 2014

Related U.S. Application Data

(63) Continuation of application No. 12/603,645, filed on Oct. 22, 2009, now Pat. No. 8,776,106.

(51) Int. Cl.
| H04N 7/16 | (2011.01) |
| H04N 21/4788 | (2011.01) |
| H04N 21/436 | (2011.01) |
| H04N 21/488 | (2011.01) |
| H04N 21/643 | (2011.01) |
| H04N 21/647 | (2011.01) |
| H04H 60/35 | (2008.01) |
| H04N 21/41 | (2011.01) |
| H04N 21/454 | (2011.01) |
| H04N 21/482 | (2011.01) |
| H04N 21/858 | (2011.01) |

(52) U.S. Cl.
CPC ........... *H04N 21/4788* (2013.01); *H04H 60/35* (2013.01); *H04N 21/4122* (2013.01); *H04N 21/4126* (2013.01); *H04N 21/43615* (2013.01); *H04N 21/454* (2013.01); *H04N 21/482* (2013.01); *H04N 21/4882* (2013.01); *H04N 21/64322* (2013.01); *H04N 21/64723* (2013.01); *H04N 21/8586* (2013.01)

(58) Field of Classification Search
CPC ........................................................ H04N 7/16
USPC ........................... 725/30, 34, 35, 91, 98, 100
See application file for complete search history.

(56) References Cited

U.S. PATENT DOCUMENTS

| 6,272,680 | B1 | 8/2001 | Gaughan |
| 6,757,707 | B1 | 6/2004 | Houghton |
| 7,823,083 | B2 | 10/2010 | Rohrabaugh et al. |
| 7,899,915 | B2 | 3/2011 | Reisman |
| 7,987,491 | B2 | 7/2011 | Reisman |
| 8,150,387 | B2 | 4/2012 | Klein |
| 2003/0037335 | A1 | 2/2003 | Gatto |
| 2005/0172234 | A1 | 8/2005 | Chuchia |
| 2006/0026279 | A1 | 2/2006 | Zigmond |
| 2006/0026637 | A1 | 2/2006 | Gatto |
| 2006/0174266 | A1 | 8/2006 | Gatto |
| 2009/0082110 | A1 | 3/2009 | Relyea |
| 2009/0094654 | A1 | 4/2009 | Sullivan |
| 2009/0109339 | A1 | 4/2009 | Ackley |

*Primary Examiner* — Kieu Oanh T Bui
(74) *Attorney, Agent, or Firm* — Guntin & Gust, PLC; Jay H. Anderson

(57) ABSTRACT

A method of monitoring video streams currently being displayed at a customer premises of an Internet Protocol television network. A plurality of Internet Protocol television video streams each currently being displayed by a respective one of a plurality of set-top box devices located at a customer premises and a universal resource locator being accessed at the customer premises are identified. The plurality of Internet Protocol television video streams currently being displayed by the respective set-top box devices are displayed together with the universal resource locator on a display device.

20 Claims, 8 Drawing Sheets

SYSTEM AND METHOD FOR A HOUSEHOLD MOSAIC VIEWER

CROSS-REFERENCE TO RELATED APPLICATIONS

This application is a continuation of U.S. patent application Ser. No. 12/603,645, filed Oct. 22, 2009, which is incorporated by reference herein in its entirety.

FIELD OF THE DISCLOSURE

The present disclosure generally relates to communications networks, and more particularly relates to a system and a method for a household mosaic viewer.

BACKGROUND OF THE DISCLOSURE

An Internet Protocol television (IPTV) service provider can transmit an IPTV signal to a user via a central office, a serving area interface, and a residential gateway. The IPTV service provider can offer the user a variety of different television programs and/or movies. For example, the IPTV service provider can supply users with real-time television programs that are typically available for the users to watch only at a specific date and time. The IPTV service provider can also offer the users on-demand movies that are available for an extended amount of time and that are provided to the users upon request of the on-demand movie.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
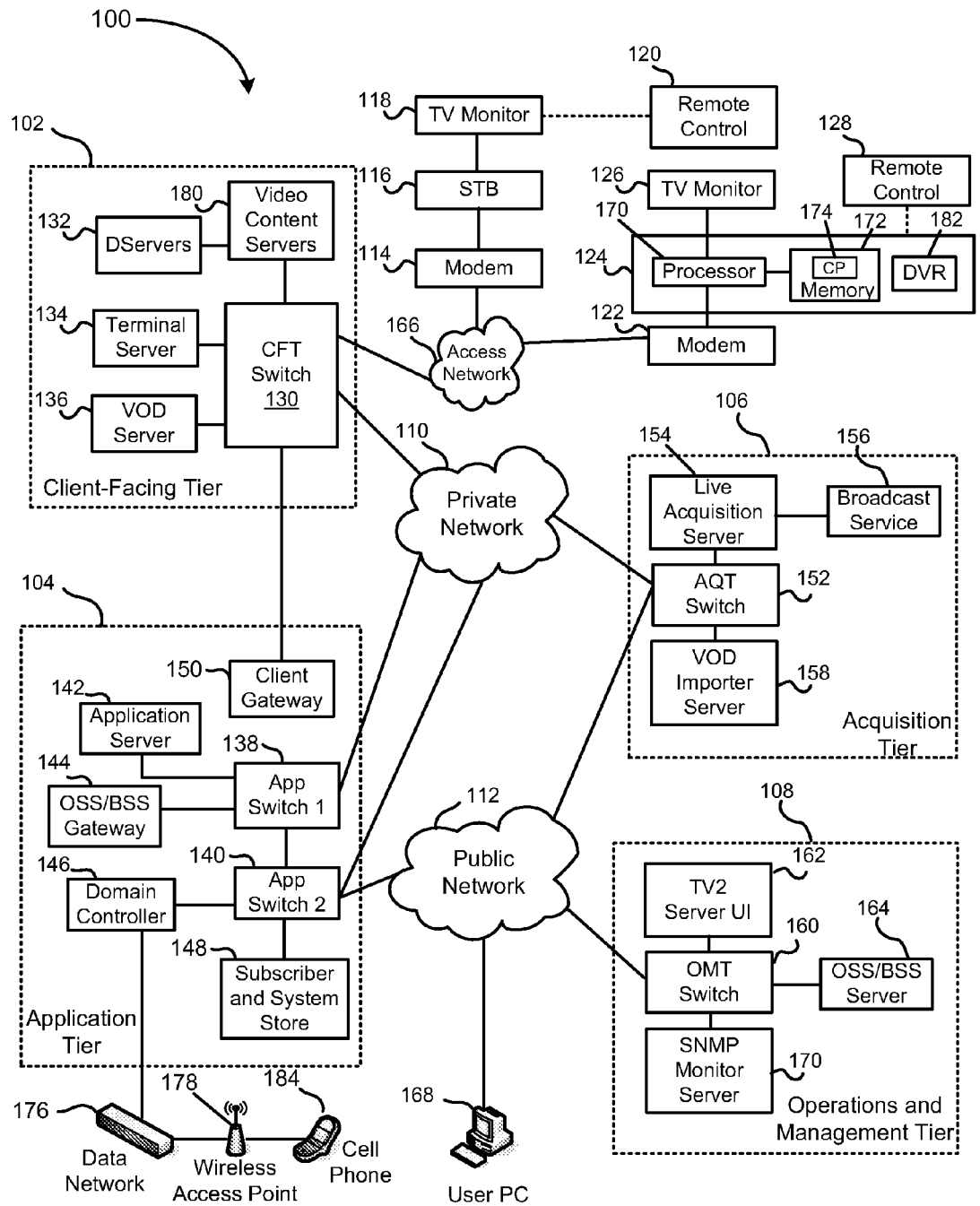
FIG. 1 is a block diagram of an Internet Protocol Television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft.®. TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an operation systems and support/billing systems and support (OSS/BSS) gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes OSS data, as well as BSS data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the first set-top box device 116 access to IPTV content and VOD content. If the client gateway 150 cannot verify subscriber information for the first set-top box device 116, such as because it is connected to a different twisted pair, the client gateway 150 can deny transmissions to and from the first set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130.

In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access point 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
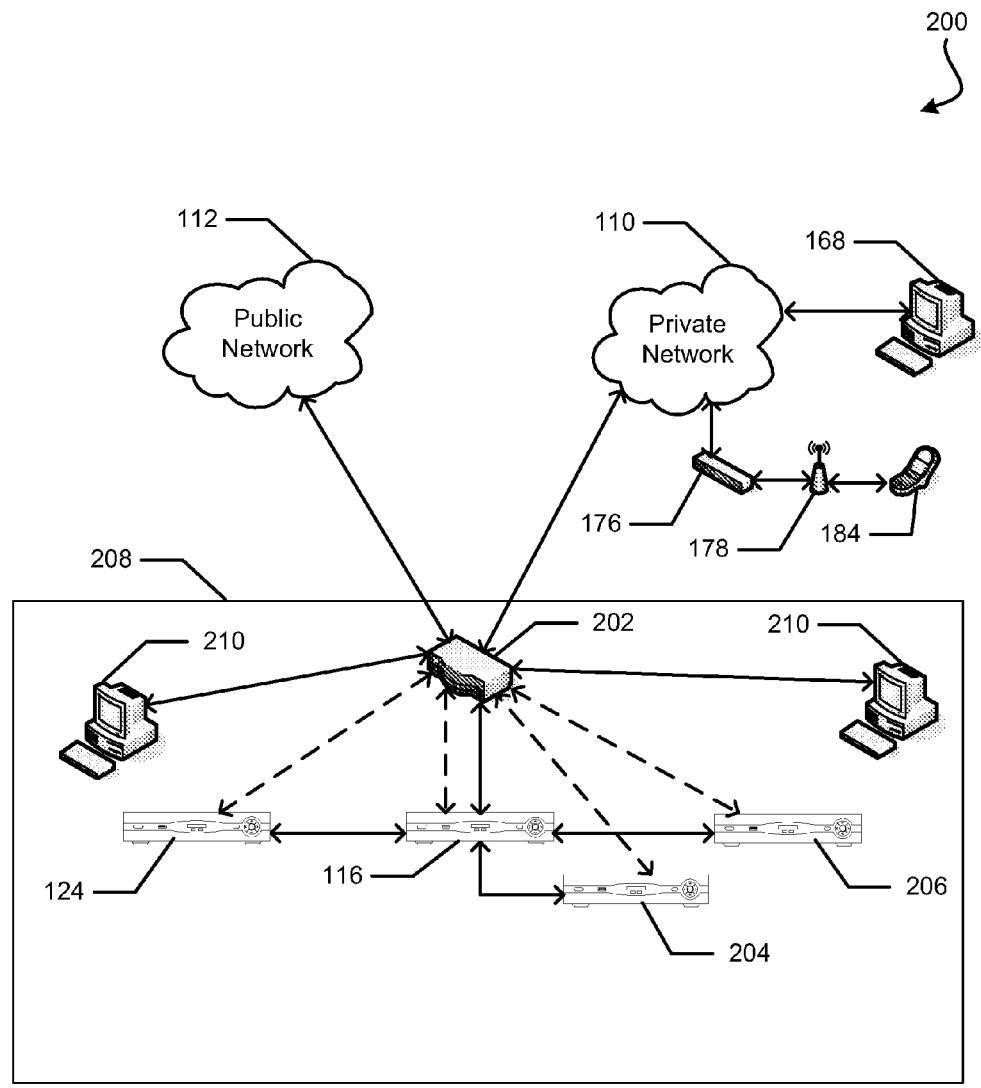
FIG. 2 is a block diagram of a portion of the IPTV system.

FIG. 2 shows a video monitoring system 200 including a residential gateway 202, set-top box devices 116, 124, 204, and 206, and computers 210. The residential gateway 202 can be a bridge, a router, an Intelligent Network Interface Device (INID), or any similar device. The residential gateway 202 is in communication with the private network 110, the public network 112, the set-top box device 116, and computers 210. The set-top box device 116 is in communication with the set-top box devices 124, 204, and 206. In another embodiment, each of the set-top box devices 116, 124, 204, and 206 can be in direct communication with the residential gateway 202, as represented by the dashed lines in FIG. 2. A Cat5 cable, a high bandwidth wireless connection, a coaxial cable, or any similar type of cable and/or connection can be used to connect the set-top box device 116 to the residential gateway 202 and to the set-top box devices 116, 204, and 206. The personal computer 168 and the cellular telephone 184 access the private network 110 through a secure login, and communicate with the set-top box device 116 through the private network and the residential gateway 202. As stated above, the cellular telephone 184 gains access to the private network 110 by the wireless network access point 178 and the data network 176.

The residential gateway 202 provides access, security information, and identification information for the set-top box device 116 to the private network 110 and the public network 112. The residential gateway 202 also transmits data between the set-top box device 116 and the private network 110, and between the set-top box device and the public network 112.

A customer premises 208 includes the set-top box devices 116, 124, 204, and 206, and the computers 210. Depending on the embodiment, the residential gateway 202 can be located within the customer premises 208 or outside of the customer premises. In operation, each of the set-top box devices 116, 124, 204, and 206 can receive channel requests for television channels to be output to display devices, such as the display devices 118 and 128 of FIG. 1. The set-top box devices 124, 204, and 206 send these requests to the set-top box device 116, which in turn requests the associated video streams from the IPTV system 100.

Figure 5:
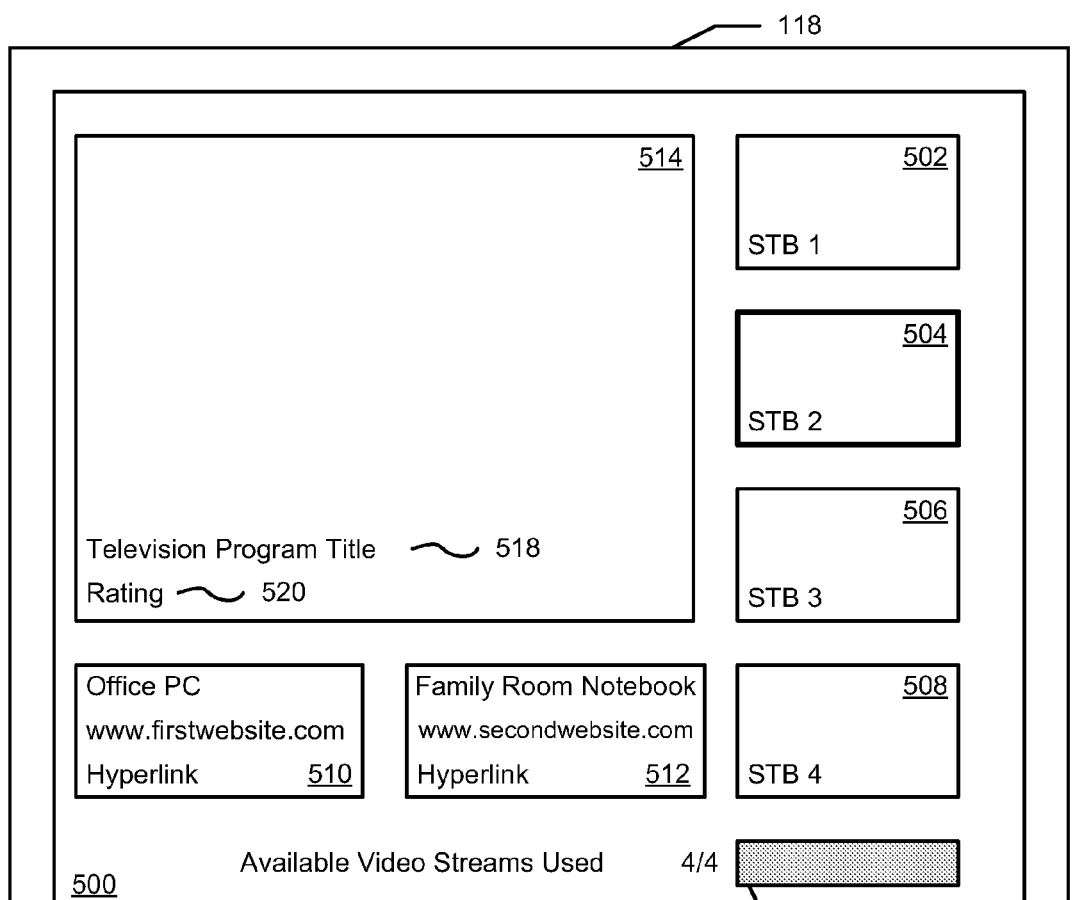
FIG. 5 is an exemplary screen shot of a household mosaic.

A user of the set-top box device 116 can request a mosaic video stream containing a mosaic of each of the television channels or video streams transmitted to each of the set-top box devices 116, 124, 204, and 206. The mosaic video stream can also containing each Internet Universal Resource Locator (URL) address or webpage address currently accessed by the computers 210 within the customer premises 208. The set-top box device 116 can provide the mosaic video stream of the television channels being transmitted to each of the set-top box devices 116, 124, 204, and 206 in response to a user request. For example, a user can use a remote control device associated with one of the set-top box devices 116, 124 204, and 206 to tune to a specific channel associated with the mosaic video stream. In response, a mosaic request can be sent to the set-top box device 116, which in turn can determine the video streams being transmitted to each of the set-top box device 116, 124, 204, and 206 and can provide the mosaic video stream for display, as shown in FIG. 5.

If the customer premises 208 also receives Internet data service from the service provider, the mosaic can also include the URL address or webpage address of each of the websites being accessed by the computers 210 connected to the residential gateway 202. Additionally, a user can use a peripheral device, such as the personal computer 168, the cellular telephone 184, or a personal digital assistant (not shown), to send the mosaic request to the set-top box device 116 and to display the mosaic video stream associated with the television channels being transmitted to each of the set-top box devices 116, 124, 204, and 206. This allows the user to monitor the channels being transmitted to the customer premises 208 from a remote location.

Figure 3:
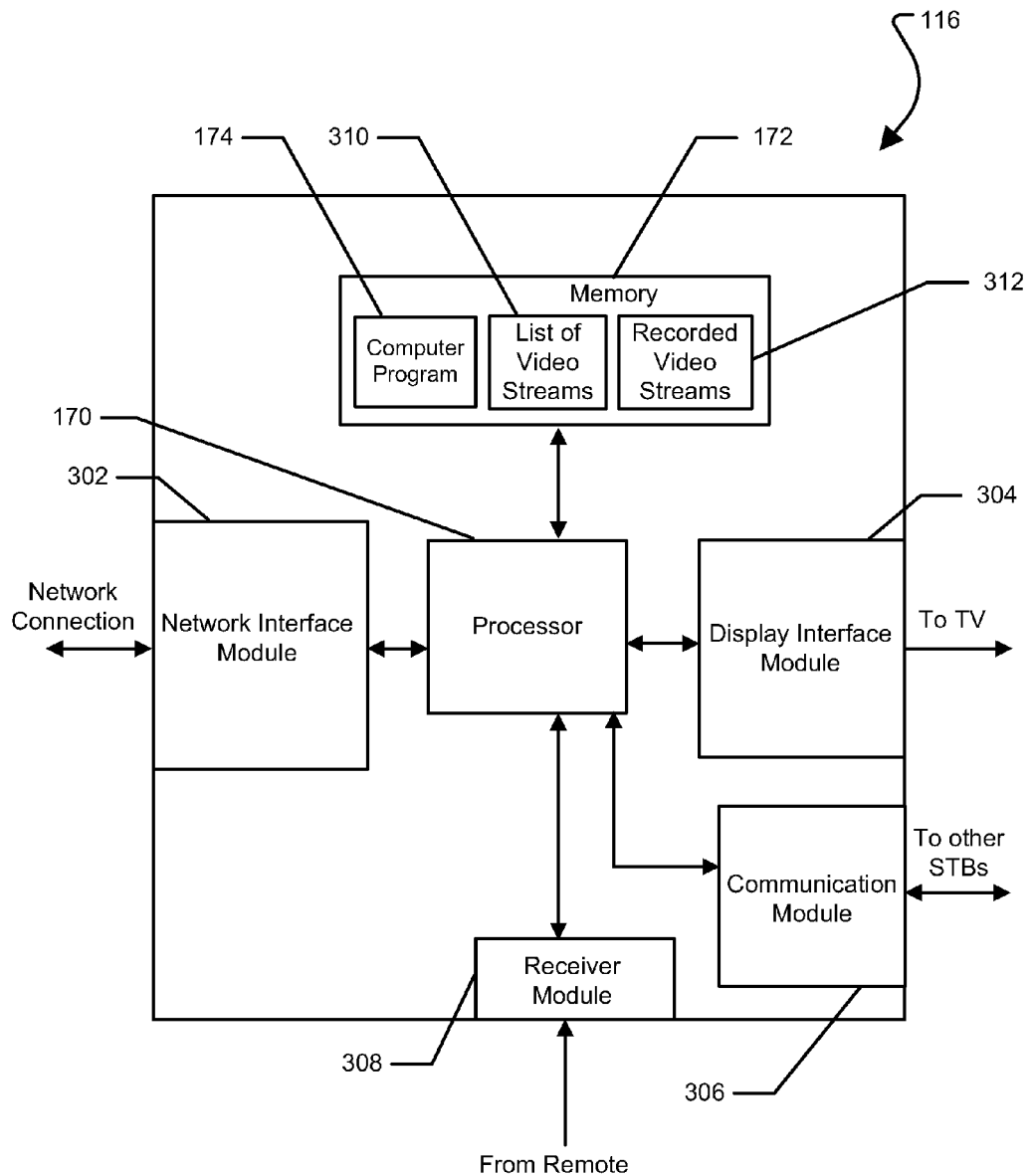
FIG. 3 is a block diagram of a particular embodiment of a set-top box in the IPTV system.

FIG. 3 shows a particular embodiment of the set-top box device 116 including the set-top box processor 170, the set-top box memory device 172, the set-top box computer program 174, a network interface module 302, and a display interface module 304. The set-top box device 116 also includes a communication module 306 and a receiver module 308. The network interface module 302 is in communication with the residential gateway 202 and is coupled to the set-top box processor 170. The set-top box memory device 172 includes the set-top box computer program 174, a list of video streams 310, and recorded video streams 312. The set-top box memory device 172 is coupled to the set-top box processor 170. The display interface module 304 is coupled to the set-top box processor 170, and adapted to communicate with the display device 118 of FIG. 1. The communication module 306 is also coupled to the set-top box processor 170, and adapted to communicate with the set-top box devices 124, 204, and 206. The receiver module 308 is coupled to the set-top box processor 170, and can be adapted to communicate with the remote control device 120. In another embodiment, each of the set-top box devices 116, 118, 204, and 206 can communicate directly with the residential gateway 202 and not with each other. In this situation, the communication module 506 is not needed to communicate with the other set-top box devices.

The network interface module 302 can be adapted to access the private network 110 or the public network 112 in the IPTV system 100 through the residential gateway 202. Accordingly, the network interface module 302 provides a physical and logical link layer for communications between the residential gateway 202 and the set-top box device 116. In an embodiment, these communications are implemented via transmission and reception of packets, and the network interface module 302 is responsible for the physical reception and transmission of the packets. The network interface module 302 can also perform additional communication overhead functions, such as error checking, flow control, or the like.

The set-top box memory device 172 can be a computer memory, including a volatile memory such as a random access memory (RAM) or non-volatile memory such as a flash memory or a hard disk. The set-top box memory device 172 can be configured to store information including the set-top box computer program 174, the list of the plurality of video streams being displayed 310, and the recorded video streams 312.

The set-top box processor 170 can be a data processor configured to execute computer instructions included in a computer readable medium of the set-top box memory device 172, control other modules of the set-top box device 116, or the like. In an embodiment, the set-top box processor 170 is a video processor configured to process received video streams and to place the video streams in an appropriate format for display. The set-top box processor 170 can also be configured to manage channel requests received at the set-top box device 116. For example, the processor 170 can be configured to determine which video streams should be requested from the acquisition tier 106 based on a received request.

The display interface module 304 can be a processor module configured to receive display information from the set-top box processor 170 and to control the display device 118, based on the received information. Accordingly, the display interface module 304 can provide a physical layer for communication of display information to the display device 118.

The communication module 306 provides an interface between the set-top box device 116 and the set-top box devices 124, 204, and 206. The communication module 306 thus provides a physical and logical link layer for communications between the devices. Accordingly, the communication module 306 can receive mosaic requests from the set-top box devices 124, 204, and 206 and provide the mosaic video stream responsive to these requests. The receiver module 308 is configured to provide a physical communications layer between the set-top box device 116 and the remote control device 120. Accordingly, the receiver module 308 is configured to receive infrared signals from the remote control device 120 and transform these signals to an appropriate form for processing at the set-top box device 116.

During operation, the IPTV system 100 transmits a plurality of video streams to the network interface module 302 via the residential gateway 202. The network interface module 302 receives the video streams and provides them to the set-top box processor 170. The set-top box processor 170 determines if a received video stream should be displayed at the display device 118 and, if so, provides the video stream to the display interface module 304. The set-top box processor 170 can also route one of the video streams to one of the set-top box devices 124, 204, and 206 via the communication module 306. In addition, the set-top box processor 170 can record video streams by saving the video streams in the recorded video streams 312 portion of the set-top box memory device 172. Furthermore, the set-top box processor 170 maintains the list of video streams 310 being transmitted to the set-top box devices 116, 124, 204, and 206. The list of video streams 310 can include television programs from the residential gateway 202, and/or the recorded video streams 312 from the memory 172. The list of video streams 310 can be stored at the set-top box memory device 172, and can be used as a basis for the mosaic video stream.

For example, the set-top box processor 170 can receive a request to display a mosaic of video streams transmitted to the set-top box devices 116, 124, 204, and 206. These requests can be received from the remote control device 120 via the receiver module 308, from one of the set-top box device 124, 204, or 206 via the communication module 306, or from a peripheral device via the network interface module 302. The request can be sent to the set-top box processor 170, which in turn can access the list of video streams 310 in the set-top box memory device 172 to retrieve the list of video streams being transmitted to the set-top box device 116, 124, 204, and 206 and can create the mosaic video stream based on the list of video streams. The set-top box processor 170 sends the mosaic video stream to the display interface module 304, the communication module 306, or the network interface module 302 depending on the source of the request. Additionally, the set-top box device 116 can require security information, such as a password or a personal identification number (PIN) before outputting the mosaic video stream. Thus, when a mosaic request is received, the set-top box device 116 can output a log-in screen 400 as shown in FIG. 4.

Figure 4:
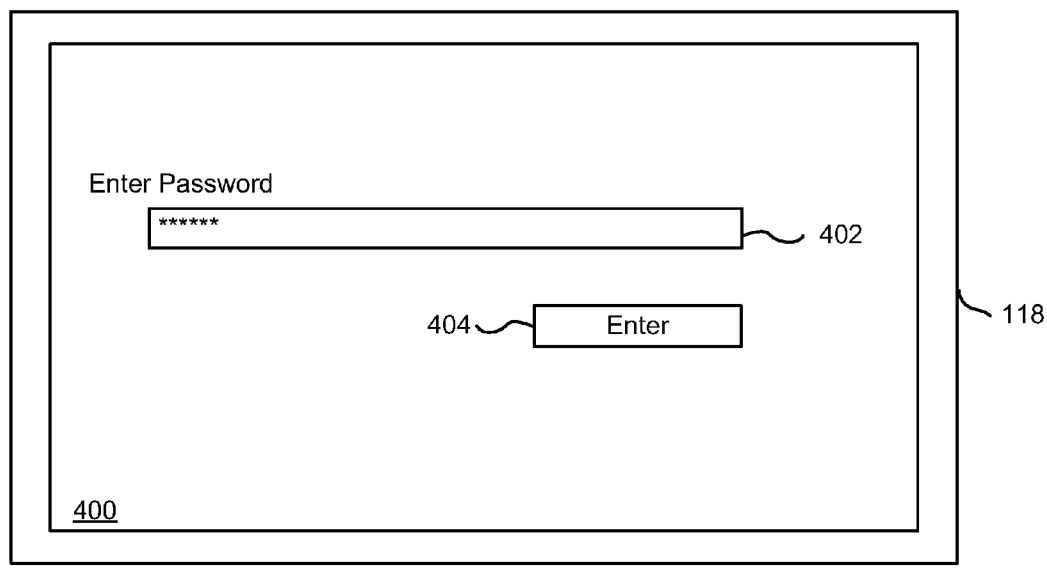
FIG. 4 is an exemplary screen shot of a sign-in graphical user interface.

FIG. 4 shows an exemplary screen shot of a log-in screen 400 including a password field 402, and a submit button 404. If the user is requesting a household mosaic via one of the set-top box devices 116, 124, 204, or 206, the user can utilize the remote controller associated with the set-top box device, such as remote control 120 or 128 of FIG. 1, to enter the password into the password field 402. The user can then select the submit button 404 to send the password to the set-top box processor 170, which in turn can compare the password with a password stored in the memory 172. In response to determining that the security information is accurate, the set-top box device 116 can send the mosaic video stream to the set-top box device 124, 204, or 206 requesting the household mosaic. The requesting device can then output the mosaic video stream as a household mosaic 500 as shown in FIG. 5.

FIG. 5 shows an exemplary screen shot of a household mosaic 500 including video streams 502, 504, 506, and 508 transmitted respectively to the set-top box devices 116, 124, 204, and 206. The household mosaic 500 also includes URLs 510 and 512 that are currently being accessed by the computers 210, a selected video stream 514, and a bandwidth usage meter 516. The household mosaic 500 can be presented in response to a mosaic request from one of the set-top box devices 116, 124, 204, or 206, the personal computer 168, or the cellular telephone 184. The video streams 502, 504, 506, and 508 can be displayed along one of the sides of the household mosaic 500, and each of the video streams can have a text string overlaid on the video stream output indicating the set-top box device that is receiving the video stream. The household mosaic 500 can also include text and/or hyperlinks associated with the URLs 510 and 512. The text can indicate the name of the website. The user can view each of the video streams 502, 504, 506, and 508 and determine whether he wants to enlarge the image of one of the video streams.

The bandwidth usage meter 516 can provide the user with textual and graphical representations of the number of video streams available to the customer premises 208 that are currently being received. For example, if the customer premises 208 has four video streams available and is currently receiving four video streams, the user can be presented with the text "Available video streams used 4/4," and can also be presented with a meter that is completed shaded as shown in FIG. 5. Thus, the user can utilize the bandwidth usage meter 516 to determine whether he can receive another video stream.

The user can select one of the video streams, such as the video stream 504, by highlighting an image associated with the video stream. When the image of a video stream is selected, the video stream can be displayed as the selected video stream 514. A television program title 518 and a rating 520 for the selected video stream 514 can be overlaid on the image of the selected video stream displayed in the household mosaic 500. The user can use the larger image of the selected video stream 514, the television program title 518, and the rating 520 to get more information about the video stream being transmitted to the set-top box device. Further, the set-top box processor 170 can receive a request to send a text message to one of the set-top box devices 124, 204, or 206 via the communication module 306. When the set-top box processor 170 receives the request to send the text message, the set-top box processor can send a text message screen 600 as shown in FIG. 6 to one of the set-top box devices 124, 204, or 206.

Figure 6:
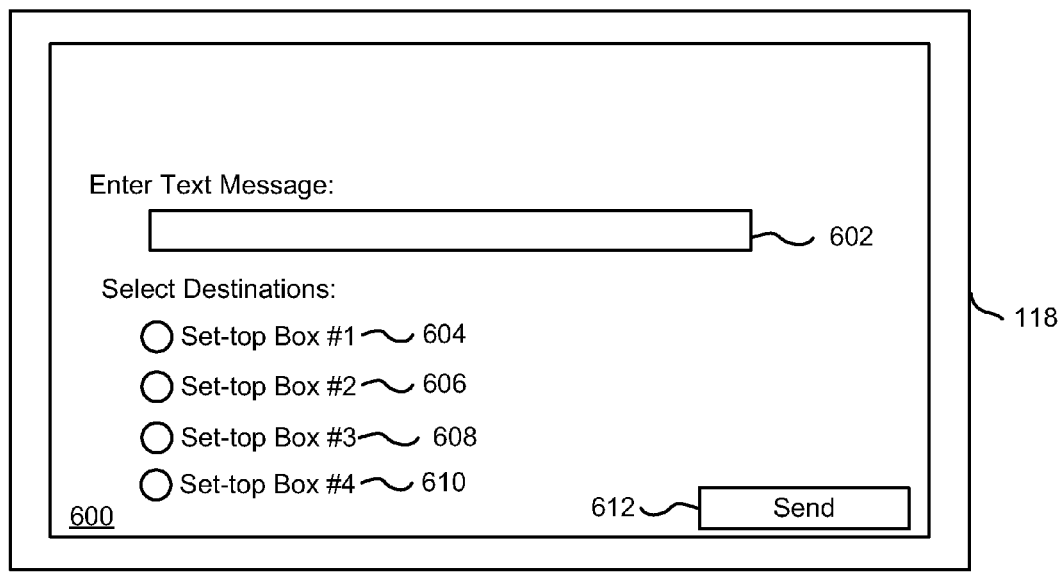
FIG. 6 is an exemplary screen shot of a text message graphical user interface.

FIG. 6 shows an exemplary screen shot of a text message screen 600 including a text message field 602, a first set-top box device destination 606 such as the set-top box device 116, a second set-top box device destination 608 such as the set-top box device 124, a third set-top box device destination 610 such as the set-top box device 204, a fourth set-top box device destination 612 such as the set-top box device 206, and a send button 614. The user can enter a message that he wants to send as a text string in the text field 602. For example, the message could be 'Change the channel', 'Turn off the television', 'Do your homework', and the like. When the message is entered, the user can select which of the set-top box devices 116, 124, 204, and 206 that the user wants to send the message. For example, the user can select the circle next to the first set-top box device destination 606, the second set-top box device destination 608, the third set-top box device destination 610, and/or the fourth set-top box device destination 612. When the user has selected the set-top box devices to send the text message, the user can then select the send button 614 to transmit the text message to the selected set-top box devices.

Figure 7:
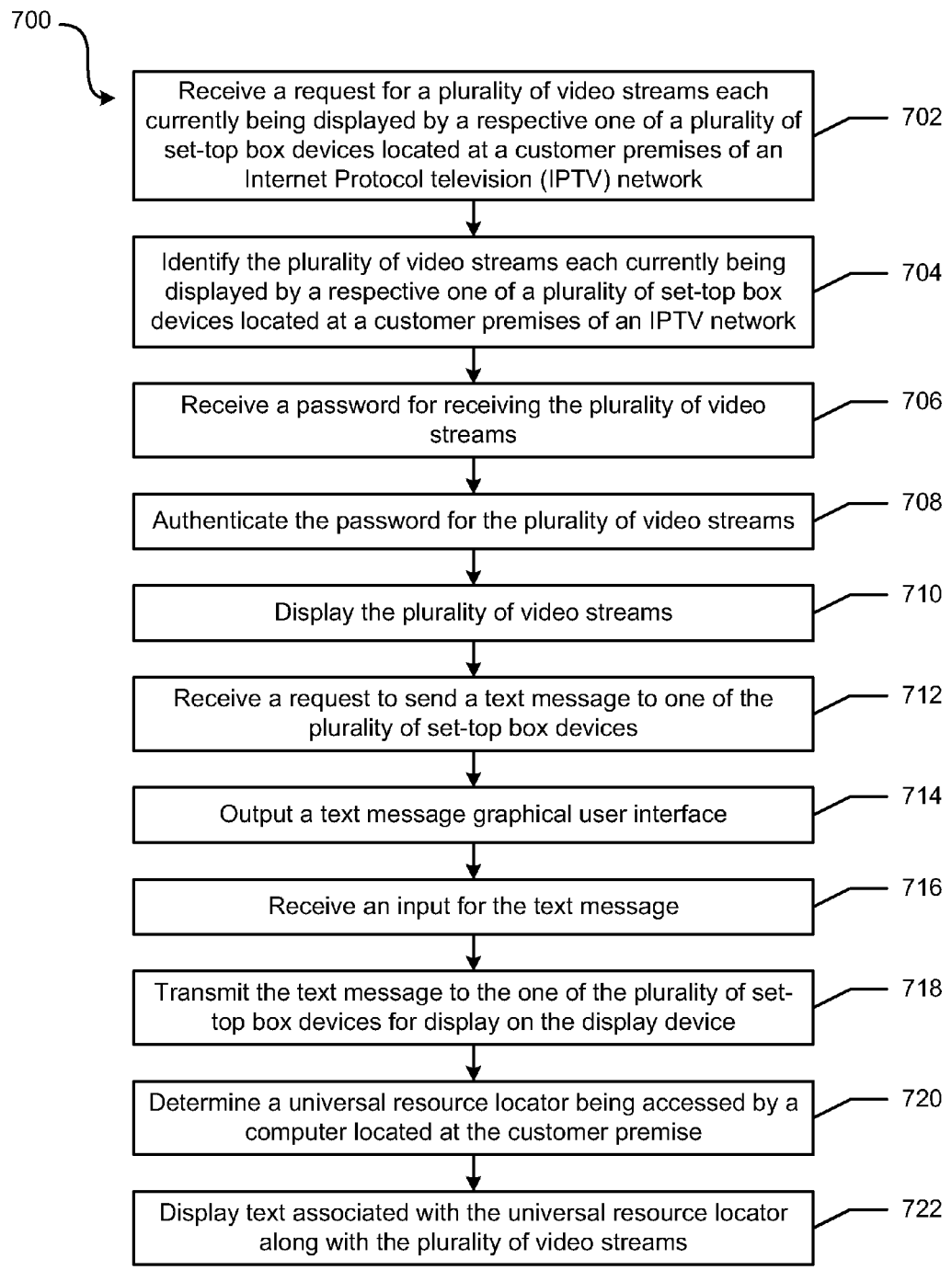
FIG. 7 is a flow diagram of a method for displaying the household mosaic.

FIG. 7 shows a method 700 for displaying the a video streams each currently being displayed by a respective one of a plurality of set-top box devices located at the customer premises of an IPTV network. At block 702, a request for the plurality of video streams each currently being displayed by the respective one of the plurality of set-top box devices located at the customer premises of the IPTV network. The request can be received from a set-top box device, a personal computer, a cellular telephone, and the like. The plurality of video streams is identified at block 704. At block 706, a password for the plurality of video streams is received. The password for the plurality of video streams is authenticated at block 708.

The plurality of video streams is displayed at block 710. At block 712, a request to send a text message to one of the plurality of set-top box devices receiving one of the video streams is received. A text message graphical user interface is output at block 714. At block 716, an input for the text message is received. The text message is transmitted to the one of the plurality of set-top box devices for display on the display device at block 718. At block 720, a universal resource locator being accessed by a computer located at the customer premises is determined. Text associated with the universal resource locator is displayed along with the plurality of video streams at block 722.

Figure 8:
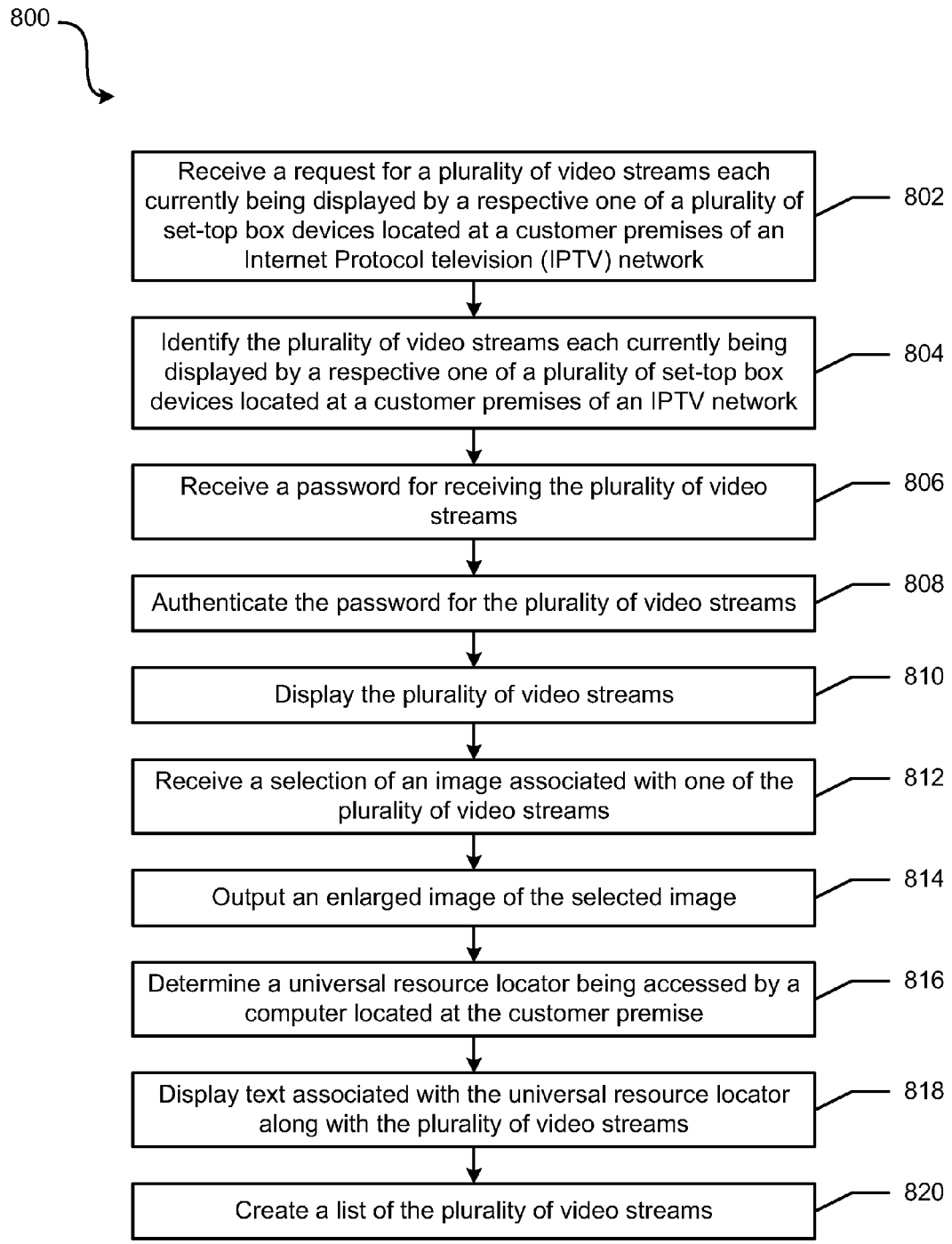
FIG. 8 is a flow diagram of an alternative method for displaying the household mosaic.

FIG. 8 shows another method 800 for displaying the video streams each currently being displayed by the respective one of a plurality of set-top box devices located at the customer premises of the IPTV network. At block 802, a request for the plurality of video streams each currently being displayed by the respective one of the plurality of set-top box devices located at the customer premises of the IPTV network. The request can be received from a set-top box device, a personal computer, a cellular telephone, and the like. The plurality of video streams is identified at block 804. At block 806, a password for the plurality of video streams is received. The password for the plurality of video streams is authenticated at block 808.

The plurality of video streams is displayed at block 810. At block 812, a selection of an image associated with one of the plurality of video streams is received. An enlarged image of the selected image is output at block 814. At block 816, a universal resource locator being accessed by a computer located at the customer premises is determined Text associated with the universal resource locator is displayed along with the plurality of video streams at block 818. At block 820, a list of the plurality of video streams is created. The list of the plurality of video stream can be continually updated.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized Accordingly, the disclosure and the FIGS. are to be regarded as illustrative rather than restrictive.

The Abstract of the Disclosure is provided to comply with 37 C.F.R. .sctn.1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A device comprising:
    a memory to store a first set of instructions and a second set of instructions; and
    a processor coupled to the memory, wherein responsive to executing the first set of instructions, the processor performs operations comprising;
        identifying a plurality of video streams associated with a plurality of set-top box devices located at a customer premises, and
        identifying a plurality of universal resource locators associated with a plurality of computing devices at the customer premises,
    wherein the memory stores a list of the plurality of video streams and the plurality of universal resource locators; and
    a communication module coupled to the processor and the memory, wherein responsive to executing the second set of instructions, the communication module performs operations comprising:
        outputting the plurality of video streams and the plurality of universal resource locators to a first portion of a display device separate from the plurality of computing devices;
        receiving a selection of an image associated with one of the plurality of video streams; and
        outputting the image on a second portion of the display device.

2. The device of claim 1, wherein the operations performed by the processor further comprise receiving a password for the plurality of video streams, and authenticating the password prior to outputting the plurality of video streams.

3. The device of claim 1, wherein the operations performed by the processor further comprise receiving a request to send a text message to one of the plurality of set-top box devices, receiving an input for the text message, and transmitting the text message to the one of the plurality of set-top box devices for display on the display device.

4. The device of claim 1, wherein the operations performed by the communication module further comprise outputting a hyperlink associated with each of the plurality of universal resource locators on the first portion of the display device.

5. The device of claim 1, wherein the operations performed by the processor further comprise displaying on a first portion of the display device a usage indicator representing a first number of video streams available at the customer premises and a second number of video streams currently being displayed at the customer premises.

6. The device of claim 1, wherein the display device is selected from the group consisting essentially of a television, a cellular telephone screen, and a personal computer monitor.

7. The device of claim 6, wherein the display device is a cellular telephone screen located outside the customer premises.

8. A computer-readable storage device comprising executable instructions which, when executed by a processor, cause the processor to perform operations comprising:
    identifying a plurality of video streams associated with a plurality of set-top boxes at a premises;
    identifying a universal resource locator associated with a computing device;
    displaying, on a first portion of a display device separate from the computing device, a mosaic comprising:
        each of the plurality of video streams,
        the universal resource locator, and
        a website name associated with the universal resource locator; and
    displaying, on a second portion of the display device, a video stream selected from the plurality of video streams.

9. The computer-readable storage device of claim 8, wherein the mosaic further comprises text or a hyperlink associated with the universal resource locator.

10. The computer-readable storage device of claim 8, wherein the mosaic further comprises a usage indicator representing a first number of video streams available at the premises and a second number of video streams currently being displayed at the premises.

11. The computer-readable storage device of claim 8, wherein the operations further comprise:
    receiving a request to send a text message to a selected media processor;
    receiving an input for the text message; and
    transmitting the text message to the selected media processor.

12. The computer-readable storage device of claim 8, wherein the display device is selected from the group consisting essentially of a television, a cellular telephone screen, and a personal computer monitor.

13. The computer-readable storage device of claim 12, wherein the display device is a cellular telephone screen located outside the premises.

14. A method comprising:
    identifying, by a system including a processor, a plurality of video streams associated with a plurality of media processors at a premises;
    identifying, by the system, a plurality of universal resource locators associated with a plurality of devices;
    displaying, on a first portion of a display device separate from the plurality of devices, a mosaic comprising:
        each of the plurality of video streams,
        each of the plurality of universal resource locators, and
        a website name associated with each of the plurality of universal resource locators; and
    displaying, on a second portion of the display device, a video stream selected from the plurality of video streams.

15. The method of claim 14, wherein the mosaic further comprises a hyperlink associated with each of the plurality of universal resource locators.

16. The method of claim 14, wherein the mosaic further comprises a usage indicator representing a first number of video streams available at the premises and a second number of video streams currently being displayed at the premises.

17. The method of claim 14, wherein an enlarged presentation of the selected video stream is displayed on the second portion of the display device.

18. The method of claim 14, further comprising:
    receiving a request to send a text message to a selected media processor;
    receiving an input for the text message; and
    transmitting the text message to the selected media processor.

19. The method of claim 14, wherein the display device is selected from the group consisting essentially of a television, a cellular telephone screen, and a personal computer monitor.

20. The method of claim 14, further comprising:
creating a list of the plurality of video streams currently being displayed by the respective media processors.

* * * * *